(12) United States Patent
Zhao et al.

(10) Patent No.: US 8,022,654 B2
(45) Date of Patent: Sep. 20, 2011

(54) SOFT START FOR ELECTRIC MOTOR OF A POWER TOOL

(75) Inventors: Peter Zhao, Baltimore, MD (US); Hung T. Du, Reisterstown, MD (US); Garrett P. McCormick, Manchester, MD (US)

(73) Assignee: Black & Decker Inc., Newark, DE (US)

( * ) Notice: Subject to any disclaimer, the term of this patent is extended or adjusted under 35 U.S.C. 154(b) by 770 days.

(21) Appl. No.: 11/988,612

(22) PCT Filed: Jul. 10, 2006

(86) PCT No.: PCT/US2006/026799
§ 371 (c)(1),
(2), (4) Date: Jan. 11, 2008

(87) PCT Pub. No.: WO2007/008839
PCT Pub. Date: Jan. 18, 2007

(65) Prior Publication Data
US 2009/0206783 A1    Aug. 20, 2009

Related U.S. Application Data

(60) Provisional application No. 60/698,233, filed on Jul. 11, 2005, provisional application No. 60/788,444, filed on Mar. 31, 2006.

(51) Int. Cl.
*H02P 1/00* (2006.01)
(52) U.S. Cl. ........ 318/526; 318/252; 318/381; 318/779; 318/432; 318/430
(58) Field of Classification Search .......... 318/244–252, 318/430, 381, 779, 432, 526
See application file for complete search history.

(56) References Cited

U.S. PATENT DOCUMENTS

| | | | |
|---|---|---|---|
| 1,828,724 A | 10/1931 | Yost | |
| 2,397,183 A | 3/1946 | Kilgore et al. | |
| 3,604,994 A | 9/1971 | Conlon | |
| 4,258,368 A * | 3/1981 | Arnold et al. | 318/782 |
| 4,371,906 A * | 2/1983 | Alessio et al. | 361/51 |
| 4,638,226 A * | 1/1987 | Damiano et al. | 318/246 |
| 5,221,189 A * | 6/1993 | Henningsen | 417/12 |
| 5,572,916 A * | 11/1996 | Takano | 83/74 |
| 5,714,861 A * | 2/1998 | Hansen et al. | 318/799 |
| 5,729,416 A * | 3/1998 | Renkes et al. | 361/23 |
| 5,757,154 A | 5/1998 | Peot | |
| 5,883,486 A * | 3/1999 | Earhart et al. | 318/778 |
| 6,781,342 B2 * | 8/2004 | Tolbert et al. | 318/784 |

\* cited by examiner

*Primary Examiner* — Walter Benson
*Assistant Examiner* — David Luo
(74) *Attorney, Agent, or Firm* — Amir Rohani

(57) ABSTRACT

A power tool has an electric motor with field windings. Each field winding includes two coils. When the motor is first energized, the two coils of each field winding are connected in series, reducing in-rush current. Upon expiration of a soft start period, the two coils of each field winding are connected in parallel. In another aspect, the field windings that are connected in series with a separate start winding when the motor is first energized. Upon expiration of the soft start period, the start winding is bypassed. In another aspect, the field windings are connected in series with a start impedance when the motor is first energized and a time delay relay having a set of delay contacts coupled across the start impedance energized. Upon expiration of the soft start period, the time delay contacts close, bypassing the start impedance. In an aspect, the motor is a universal motor.

35 Claims, 3 Drawing Sheets

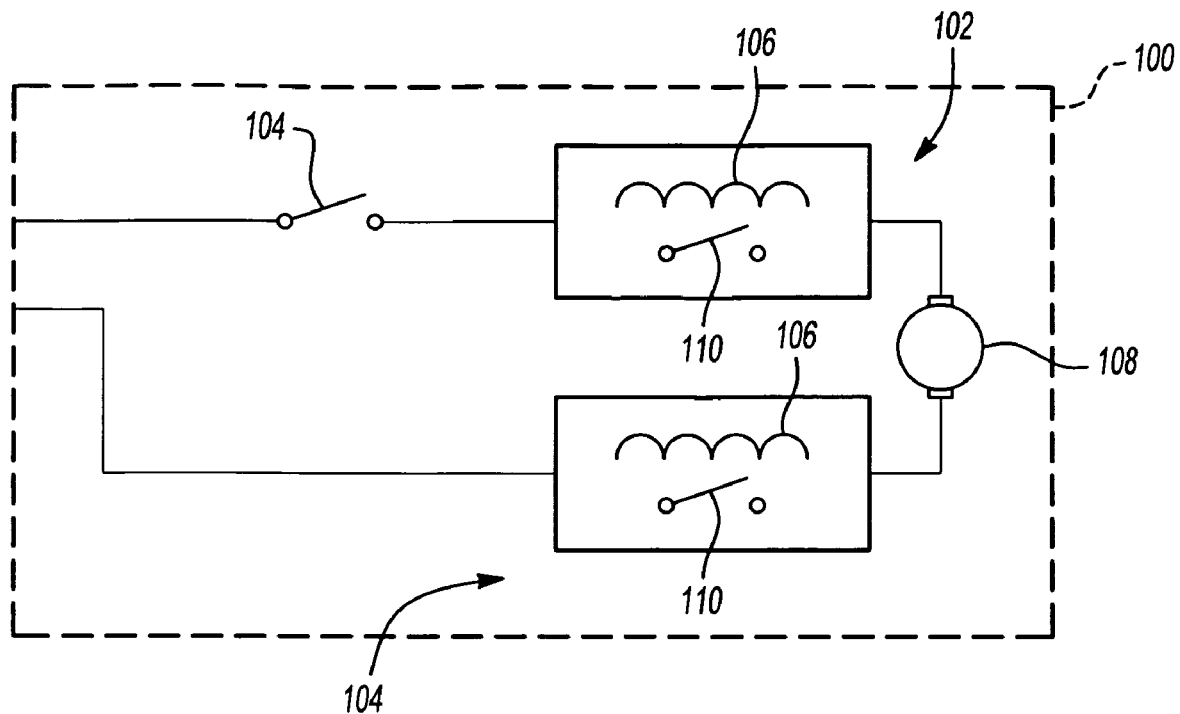
_Fig-1_
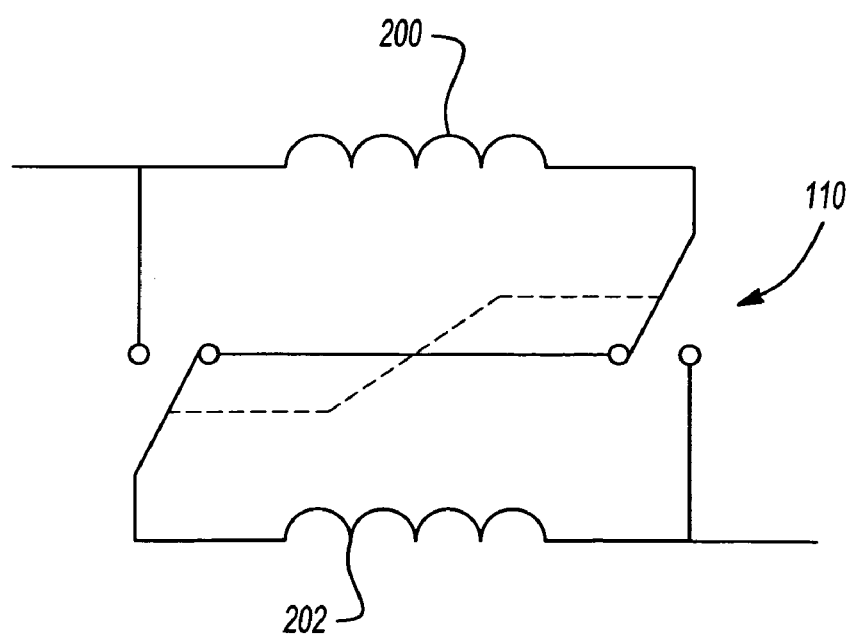
_Fig-2_

SOFT START FOR ELECTRIC MOTOR OF A POWER TOOL

FIELD

The present invention relates to power tools, and more particularly, to soft starting an electric motor of a power tool.

BACKGROUND

When the electric motor of a power tool is started, there is an in-rush current that greatly exceeds the steady state current. In many power tools, this in-rush current must be compensated for to avoid problems. For example, in larger electrical motors, such as four horsepower and above, the in-rush current is sufficient to trip a 20 amp circuit breaker, the typical size circuit breaker used to protect the electrical outlets in houses. To prevent the problems caused by the in-rush current when the power tool motor is first started, the motor is soft started in many power tools.

Two approaches are typically used for soft starting electric motors in power tools—phase control, sometimes referred to as electronic, and mechanical. In the phase control approach, a thyristor, such as a triac or silicon controlled rectifier (SCR) is used to switch power to the motor. When the motor is first started, turn-on of the thyristor is delayed a predetermined number of degrees out of each half cycle of the AC waveform. For example, turn-on of the thyristor might be delayed thirty degrees during each half cycle of the AC waveform so that the thyristor is not turned on in each half cycle until thirty degrees into the half cycle. After the motor reaches a predetermined speed, or an appropriate period of time elapses, the delayed turn-on of the thyristor ceases and the thyristor is turned-on at the beginning of each half-cycle.

In the mechanical approach, a power resistor is switched in series with the motor windings during soft starting. Once the speed of the motor reaches a predetermined speed, or an appropriate period of time lapses, the power resistor is bypassed. The switch used to switch power to the motor typically includes the appropriate contacts that connects the power resistor in series with the motor windings and then bypasses the power resistor.

Both the phase control and mechanical approaches have the disadvantages of taking up space and adding cost. In addition, the phase control approach reduces motor system performance because of the power loss from phase control. The mechanical approach additionally has the disadvantage that the power resistor must be able to withstand the in-rush current which typically dictates that a ceramic power resistor be used. The ceramic power resistor must be packaged in the power tool in such a manner to protect it from shock so that it won't break if the power tool is dropped.

SUMMARY

A power tool in accordance with an aspect of the invention has an electric motor with field windings. In an aspect of the invention, each field winding includes two coils wound with the same number of turns of the same gauge magnet wire. When the motor is first energized, the two coils of each field winding are connected in series, reducing in-rush current. After the motor reaches a predetermined speed, or a predetermined time period elapses, the two coils of each field winding are connected in parallel. In an aspect, the electric motor is a universal motor.

In another aspect of the invention, an electric motor used in a power tool includes field windings that are connected in series with a separate start winding when the motor is first energized. After a predetermined period of time elapses, or the motor reaches a predetermined speed, the start winding is bypassed.

In another aspect of the invention, the separate start winding is includes two sub-windings. The two sub-windings are connected in a way that magnetic field created by the two sub-windings is counterbalanced so that the overall magnetic force created by the start winding in the motor armature is minimized or zero. Also, the voltage across the two sub-windings is minimized or zero.

In another aspect of the invention, an electric motor used in a power tool includes field windings that are connected in series with a start impedance when the motor is first energized. Upon expiration of a soft start period, the start impedance is bypassed by time delay contacts of a time delay relay. In an aspect, the start impedance is a resistance. In another aspect, the start impedance is the separate start winding discussed above.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a simplified schematic of a power tool having an electric motor that is soft started in accordance with an aspect of the invention by connecting two coils of each field winding in series during soft starting and in parallel after soft starting;

FIG. 2 is a simplified schematic showing the interconnecting of the two coils of each field winding of FIG. 1;

DETAILED DESCRIPTION OF THE PREFERRED EMBODIMENTS

Figure 3:
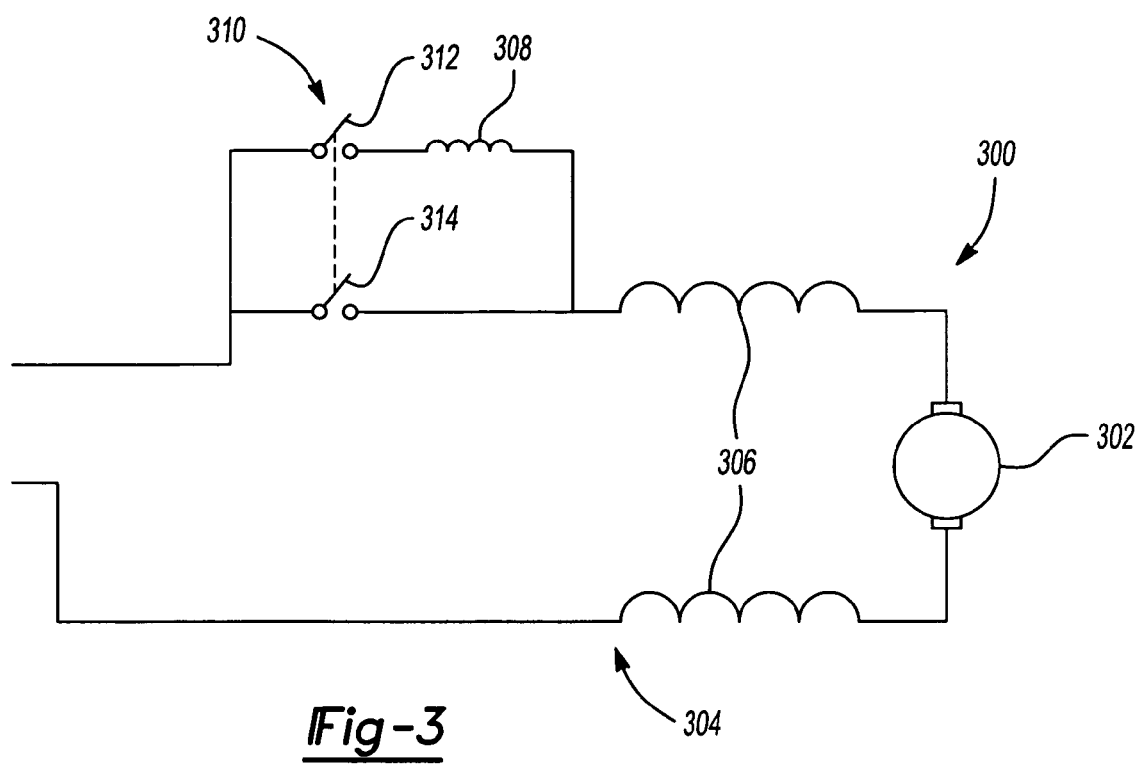
FIG. 3 is a simplified schematic of an electric motor of a power tool that is soft started in accordance with an aspect of the invention by connecting a separate start winding in series with the field windings of the motor during soft starting and bypassing the separate start winding after soft starting.

The following description of the preferred embodiment(s) is merely exemplary in nature and is in no way intended to limit the invention, its application, or uses.

Referring to FIG. 1, a power tool 100 is shown representatively by box 100. Power tool 100 includes a motor 102 coupled to a source of AC power (not shown). A power switch 104 illustratively couples one line of the AC power to motor 102. Motor 102 includes a field 104 having field windings 106 and armature 108, which may also have windings (not shown)

such as in a universal motor. Each field winding 106 includes two coils 200, 202 (FIG. 2). The two coils 200, 202 are switched in series during soft starting and in parallel after soft starting by a switch or switching arrangement 110, referred to herein as soft start switch 110.

With reference to FIG. 2, soft start switch 110 connects coils 200, 202 in series when in a first position (shown in FIG. 2) and in parallel when in a second position. Soft start switch 110 connects coils 200, 202 in series when motor 102 of power tool 100 is first started. When coils 200, 202 are connected in series, this increases the impedance of field winding 106 and limits in-rush current. Upon expiration of a soft start period, soft start switch 110 changes to its second position and connects the coils 200, 202 in parallel. In an aspect, the soft start period expires upon motor 102 reaching a predetermined speed. In an aspect, the soft start period expires after the elapse of a predetermined period of time. The soft start period, e.g., the predetermined speed or predetermined time period, is set so that when coils 200, 202 are connected in parallel, the motor in-rush current has fallen to a level that eliminates or at least reduces the above discussed problems. For example, when the motor reaches the predetermined speed or after the predetermined time period has expired, the motor in-rush current will have fallen to a level where it won't trip the circuit breaker protecting the AC power source. In this regard, the predetermined speed will be a percentage of no-load speed that is greater than zero and up to one-hundred percent. The predetermined speed may illustratively be in the range of 50% to 80% of no-load speed. The predetermined time period may illustratively be at least 2 msec. Soft start switch 110 (which can be an arrangement of switches) can be a mechanically actuated switch that is actuated by an actuator element that responds to the speed of motor 102, such as an actuator that is moved by centripetal force. Soft start switch 110 may also be a time delay switch that switches after the predetermined time period. Soft start switch 110 may also be an electro-mechanical switch, such as a relay, that is actuated by a control circuit upon motor 102 reaching the predetermined speed, or the predetermined time period elapsing. In this regard, soft start switch 110 may be a time delay relay. Soft start switch 110 may also be an electronic switch (such as triacs, SCRs, MOSFETs, and the like) that are switched by a control circuit upon motor 102 reaching the predetermined speed, or the predetermined time period elapsing.

The parallel connection of coils 200, 202 decreases the impedance of field winding 106 and provides maximum power for motor 102. In this regard, coils 200, 202 are illustratively wound with the same number of turns of magnet wire. They are also wound with a gauge of magnet wire to provide the equivalent of a single coil field winding when coils 200, 202 are connected in parallel. As is known, the maximum no load speed of the motor determines the number of turns of magnet wire that the field winding has. The field winding is then wound with the largest gauge magnet wire that allows that number of turns of magnet wire to fit in the slots of the lamination stack of the field. For example, a 55 mm frame size (OD of stator) electric motor may have single coil field windings wound with five turns of 18 AWG magnet wire. In a 55 mm frame size motor in accordance with the above aspect of the invention, the coils 200, 202 of each field winding 112 of a 55 mm frame size motor are each wound with five turns of 21 AWG magnet wire. When connected in parallel, coils 200, 202 wound with 21 AWG magnet wire are the equivalent of the single coil wound with 18 AWG wire.

With reference to FIG. 3, an alternative soft start approach in accordance with an aspect of the invention is described. In FIG. 3, an electric motor 300 includes an armature 302, a field 304 having field windings 306 and a start winding 308. Motor 300 is illustratively used in a power tool, such as power tool 100 (FIG. 1). A start switch 310 connects motor 300 to a source of AC power (not shown). Start switch 310 includes a first normal contact 312 and a second, delay contact 314. When start switch 310 is closed, first contact 312 closes, connecting start winding 308 in series with the field windings 306 of field 304 and where armature 302 has armature windings (e.g., a universal series motor), in series with those windings as well. Delay contact 314 remains open. After a predetermined period of time, delay contact 314 closes, bypassing start winding 308. It should be understood that delay contact 314 could also be closed when motor 300 reaches a predetermined speed similar to that described above. It should also be understood that the start winding 308 and start switch 310 may include two start windings 308 and start switches 310, with one of the start windings 308 connected to one of the field windings 306 and the other start winding 308 connected to the other field winding 306, with one of the start switches 310 switching one of the start windings 308 and the other of the start switches 310 switching the other one of the start windings 308. Switch 310 may illustratively be a time delay switch that switches delay contact 314 after the predetermined time period. Switch 310 may also be an electromechanical switch, such as a relay, where the delay contact 314 is actuated by a control circuit upon motor 300 reaching the predetermined speed, or the predetermined time period elapsing. Switch 310 may also be an electronic switch where the first contact 312 and the delay contact 314 may be electronic switches (such as triacs, SCRs, MOSFETs, and the like) where the first contact 312 and the delay contact 314 are switched by a control circuit, with delay contact 314 being switched upon motor 300 reaching the predetermined speed, or the predetermined time period elapsing. Switch 310 may illustratively include a time delay relay, such as time delay relay 516 (FIG. 5), that provides delay contact 314.

When start winding 308 is connected in series with field windings 306 (and the windings of armature 302 of motor 300 as applicable), impedance is increased and in-rush current reduced. The soft start period (e.g., the predetermined time period) for closing second switch 314 is set sufficiently long so that when second switch 314 is closed, the in-rush current has fallen to a level where it doesn't trip the circuit breaker for the AC power source.

While FIG. 3 shows second contact 314 shorting start winding 308, it should be understood that switch 310 can be configured so that start winding 308 is disconnected from field windings 306 and the windings of armature 302 after the predetermined time period, or after motor 300 reaches the predetermined speed.

Start winding 308 is illustratively wound with the number of turns and gauge of magnet wire to suit the particular application in which motor 300 is used.

Figure 4:
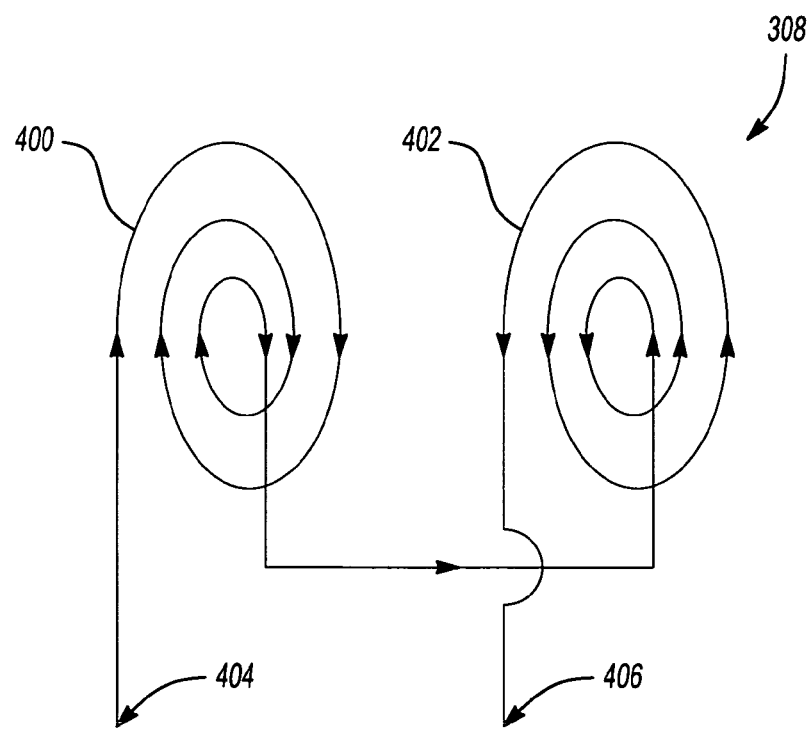
FIG. 4 is a simplified schematic of a variation of FIG. 3 in accordance with an aspect of the invention in which the separate start winding includes two sub-windings.

Referring to FIG. 4, a variation of the embodiment of FIG. 3 is described. In FIG. 4, start winding 308 includes first and second sub-windings 400, 402. First and second sub-windings 400, 402 may illustratively be wound in the same slot or slots of the field 304. Sub-windings 400, 402 are connected so that current flows through them in opposite directions. For example, in sub-winding 400, current flows in a clockwise direction (as oriented in FIG. 4) and in sub-winding 402, current flows in a counterclockwise direction. It should be understood that sub-windings 400, 402 could alternatively be connected so that current flow in a counterclockwise direction in sub-winding 400 and a clockwise direction in sub-winding 402. First and second sub-windings 400, 402 may also be connected so that current flows from an outside of sub-winding 400 to an inside of sub-winding 400 (as it is disposed in the slot or slots of field 304) and in sub-winding 402, current flows from an inside of sub-winding 402 to an outside of sub-winding 402, or vice-versa. By connecting sub-windings 400, 402 of start winding 308 in this manner, the magnetic fields generated by sub-windings 400, 402 counterbalance each other so that that start winding 308 creates little if any magnetic force in armature 302. It also minimizes any circulation current in start winding 308 when the motor 300 is running. Further, the voltage drop across start winding 308 (from point 404 to point 406) will, particularly when it is shorted by delay contact 314, be close to zero or zero, minimizing or eliminating any induced current flow. In contrast, collapsing the magnetic field in a single start winding by shorting it results in induced current flow.

Figure 5:
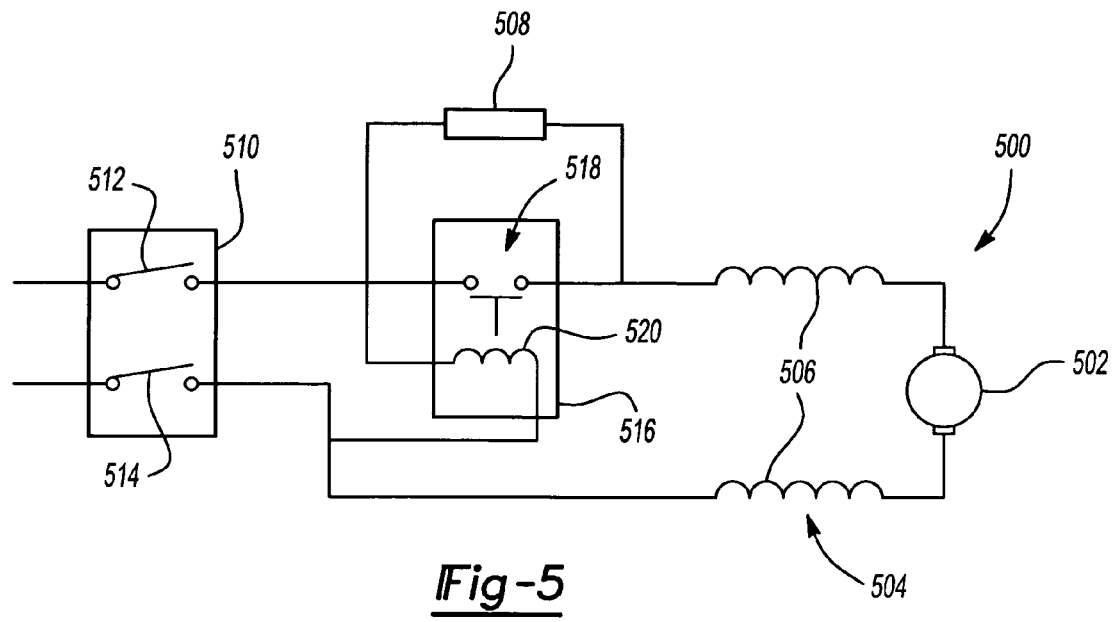
FIG. 5 is a simplified schematic of an electric motor circuit, such as for a power tool, having an electric motor that is soft started in accordance with an aspect of the invention by a time delay relay that connects a separate start winding or resistor in series with the field windings of the motor during soft starting and bypassing the start winding or resistor after soft starting.

Referring to FIG. 5, an alternative soft start approach in accordance with an aspect of the invention is described. In FIG. 5, an electric motor 500 includes an armature 502, a field 504 having field windings 506 and a start impedance element 508, which may illustratively be a winding or a resistor. A power switch 510, which may illustratively be a double pole, single throw switch (having first and second contacts 512, 514), connects both sides of motor 500 to a source of AC power (not shown). A time delay relay 516 has time delay contacts 518 that couple one of field windings 506 to first contact 512 of power switch 510. An energization portion 520 of time relay 516 (shown representatively as a coil 520) is coupled across first and second contacts 512, 514 of power switch 510.

When power switch 510 is first closed, time delay contacts 518 of time delay relay 516 are open connecting start impedance 508 in series with the field windings 506 of field 504 and, if applicable, armature windings (not shown) of armature 502 of motor 500. Energization portion 520 of time delay relay 516 is energized, starting timing of time delay relay 516. After a predetermined period of time, such as at least 2 msec. for example, time delay relay 516 times out closing time delay contacts 518 of time delay relay 516. This shorts start impedance 508 thus bypassing it.

An advantage of using a time delay relay, such as time delay relay 516, is that the time delay relay provides a reliable, low cost way of implementing the delay switching used in switching the start impedance out of the motor circuit.

The above described soft start approaches in accordance with aspects of the present invention provide a number of advantages over the prior art soft start approaches described in the Background section. In addition to reducing in-rush current, they also provide significant cost reductions compared to the prior art approaches and are more reliable. They eliminate or greatly reduce reliability issues caused by the thermal performance of electronic devices, contamination and assembly in the phase control or electronics approach. They also eliminate or greatly reduce reliability issues caused by the need for robustness (e.g., to protect the power resistor) and assembly in the mechanical approach. They also take up little if any of the additional room in the power tool required by the prior art approaches.

The above described soft start approaches in accordance with aspects of the present invention reduce "gear growl." As is known, motor torque is a product of the back EMF of the motor and current. Therefore, its principle frequency is 120 cycles instead of 60 cycles. This 2× in frequency plus high peak motor torque during start-up magnify the noise generated by "gear backlash." Gear backlash is how far back and forth the output spindle can be turned while the input is held tight. The above described soft start approaches in accordance with aspects of the present invention reduce peak torque, thus reducing gear growl.

Figure 6:
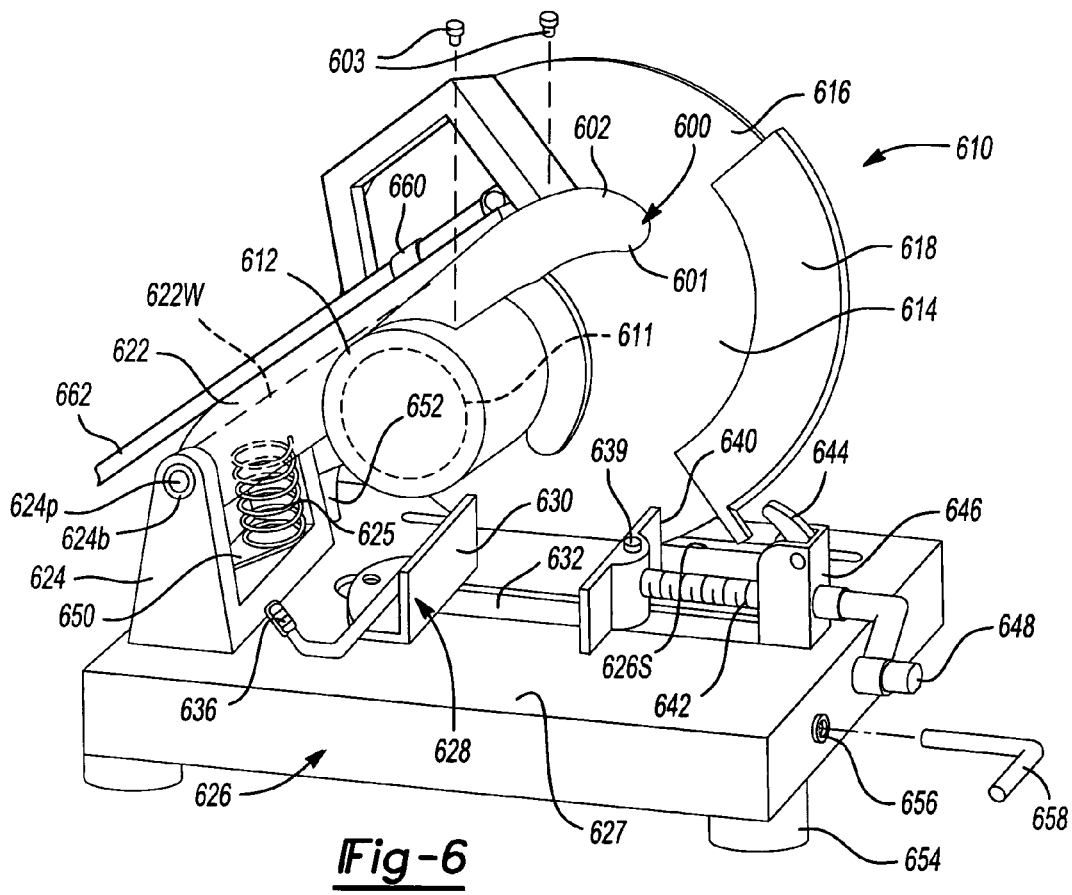
FIG. 6 is a perspective view of a chop saw in accordance with an aspect of the invention.

Turning now to FIG. 6, a power tool 610 is shown. Power tool 610 is illustratively a chop saw, however any type of power tool may be used in accordance with the present invention where soft starting is advantageous. Chop saw 610 has the basic characteristics of chop saws, such as the chop described in U.S. Pat. No. 6,609,442 for Chop Saw (the entire disclosure of which is incorporated by reference herein). While FIG. 6 (other than the reference numbers) is identical to FIG. 1 of U.S. Pat. No. 6,609,442, it should be understood that chop saw 610 is not identical to chop saw 10 disclosed therein and has the differences in accordance with aspects of the invention as discussed below.

Chop saw 610 includes a motor field case or housing 612 containing an electric motor 611 which drives a tool such as blade 614. Electric motor 611 is an AC motor having a stator with field windings and an armature, and is soft started in accordance with any of the above described aspects of the invention. A power cord 662 couples motor 611 to an AC source of power (not shown) and power cord 662 may be held in place by tabs 660. A stationary guard 616 covers a portion of the blade 614. A movable guard 618 may telescope over the stationary guard 616, or preferably pivot about a point to expose blade 614 during a cutting operation.

A handle 600 is preferably mounted on motor field case 612 and/or an arm 622. Preferably handle 600 includes a lower portion 601 mounted on motor field case 612 (and/or arm 622), and an upper portion 602 fixedly attached to lower portion 601. Screws 603 may be used to attach upper portion 602 to lower portion 601.

Arm 622 preferably also carries blade 614, and guards 616, 618. Arm 622 is pivotally mounted on an arm support 624, which is mounted on base 626. Preferably, a pivot rod 624P is disposed between the arm support 624. Arm 622 is preferably pivotably disposed on pivot rod 624P, allowing the chopping action. Preferably, the arm 622 and/or arm support 624 may have at least one bearing 624B disposed about and/or supporting the pivot rod 624P for facilitating rotation thereabout. Accordingly, arm 622 may be moved between two positions: an upper position, where the blade 614 does not engage the workpiece (not shown), and a lower position, where the blade 614 engages and cuts the workpiece. Preferably, blade 614 may be plunged through a slot 626S on base 626.

Arm support 624 preferably has a forwardly-extending portion 650. Preferably portion 650 is fixedly attached to arm support 624, so that portion 650 does not move. A spring 625 is supported between portion 650 and an inner wall 622W of arm 622. Because the spring 625 is preferably an expansion spring (also known as a compression spring), arm 622 is normally biased towards the upward position by spring 625.

A chip deflector 652 may be mounted on base 626 and/or to arm support 624. Chip deflector 652 assists in directing the flow of chips resulting from the cutting operation.

Base 626 has a workpiece support (or work surface) 626. Fence subassembly 628 is preferably disposed on workpiece support 627. Preferably, an operator may slide and rotate fence subassembly 628 along workpiece support 627.

Fence subassembly 628 includes a workpiece-engaging portion 630 which is guided along the base 626 via a slot formed in the work surface 627 (through-slot 632), as well as actuator 636, which the operator may rotate to lock or unlock the fence subassembly 628 as desired.

A vise jaw 640 co-acts with fence subassembly 628 to clamp a workpiece. The vise jaw 640 may rotate, so that a workpiece can be clamped in a desired angular orientation relative to blade 614. Preferably the fence subassembly 628 and vise jaw 640 can be rotated along their respective "Y" axes to achieve a desired angle such as, for example, 30. degree. or 45. degree., so that the chop saw can make a miter cut. The vise jaw 640 may be advanced to a clamping position by rotation of vise screw 642. Preferably the axis of vise screw 642 is substantially parallel to the work surface 627. The vise jaw 640 preferably pivots about jaw bolt or pin 639, which is sized to slideably advance or retract along throughslot 632.

A vise latch 674 may be mounted in a conventional way on a latch support 646 to latch the vise screw 642 in its clamping position. The clamping force can be augmented by rotation of vise handle 648, which is fixedly connected to vise screw 642. Persons skilled in the art will recognize that the vise latch 644 may be disengaged to allow movement of the vise screw 642 towards fence subassembly 628, then engaged to latch the vise screw 642 in its clamping position. Base 626 may also have molded rubber feet 654 disposed thereon. Further, base 626 may have a rubber grommet 656, which receives a wrench 658.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A power tool, comprising:
   a housing having an electric motor disposed therein that drives a tool;
   the electric motor having field windings and an armature;
   a first switch that couples the field windings of the electric motor to a source of AC power when the first switch is in an on position; and
   each field winding of the electric motor including first and second windings interconnected by a soft start switch that utilizes the first and second windings to perform a soft start operation, wherein the soft start switch connects the first and second windings in series to perform the soft start operation during a soft start period that begins when the first switch is switched to its on position and connects the first and second windings in parallel upon expiration of the soft start period to begin normal operation of the electric motor.

2. The apparatus of claim 1 wherein the expiration of the soft start period occurs when the motor reaches a predetermined speed.

3. The apparatus of claim 2 wherein the power tool is a chop saw and the electric motor is at least four horsepower.

4. The apparatus of claim 1 wherein the expiration of the soft start period occurs at the expiration of a predetermined period of time.

5. The apparatus of claim 4 wherein the power tool is a chop saw and the electric motor is at least four horsepower.

6. The apparatus of claim 5 wherein the electric motor is a universal motor.

7. In an electric motor having a stator with field coils, each field coil including first and second windings, a method of soft starting the electric motor, comprising:
   connecting the first and second windings of each field coil in series upon power first being coupled to the field windings of the motor to perform a soft start operation; and
   connecting the first and second windings of each field coil in parallel at the expiration of a soft start period to begin normal operation of the electric motor.

8. The method of claim 7 wherein the soft start period expires when the motor reaches a predetermined speed.

9. The method of claim 7 wherein the soft start period expires at the expiration of a predetermined period of time.

10. A power tool, comprising:
    a housing having an electric motor disposed therein that drives a tool; and
    the electric motor having a field having field coils, each field coil including first and second windings, a soft start switch for each field coil utilizing the first and second windings to perform a soft start operation by connecting the first and second windings of that field coil in series during a soft start period that begins when power is first applied to the field coils and in parallel at the expiration of the soft start period to begin normal operation of the electric motor.

11. The apparatus of claim 10 wherein the soft start period expires when the motor reaches a predetermined speed.

12. The apparatus of claim 11 wherein the power tool is a chop saw and the electric motor is at least four horsepower.

13. The apparatus of claim 10 wherein the soft start period expires at the expiration of a predetermined period of time.

14. The apparatus of claim 13 wherein the power tool is a chop saw and the electric motor is at least four horsepower.

15. The apparatus of claim 14 wherein the electric motor is a universal motor.

16. A power tool, comprising:
    a housing having an electric motor disposed therein that drives a tool;
    the electric motor having a field and an armature, the field having field windings and a start winding, wherein the start winding includes first and second sub-windings connected together so that the magnetic fields generated by the first and second sub-windings counterbalance each other;
    a switch that couples the electric motor to a source of AC power with the start winding in series with the field windings when the switch is first placed in an on position and, upon the expiration of a soft start period, bypasses the start winding.

17. The apparatus of claim 16 wherein the soft start period expires when the motor reaches a predetermined speed.

18. The apparatus of claim 16 wherein the soft start period expires at the expiration of a predetermined period of time.

19. The apparatus of claim 16 wherein the switch includes a set of delay contacts coupled across the start winding and a set of instantaneous contacts coupled in series with the start winding and field windings, the instantaneous contacts closing when the switch is placed in the on position and connecting the start winding and field windings in series to the source of AC power, the delay contacts open when the switch is first placed in the on position and closing upon expiration of the soft start period, the delay contacts bypassing the start winding when closed.

20. The apparatus of claim 19 wherein the switch includes a time delay relay having the delay contacts.

21. The apparatus of claim 19 wherein the first and second sub-windings of the start winding are connected so that electrical current flows through them in opposite directions.

22. The apparatus of claim 21 wherein the first and second sub-windings of the start winding are disposed in slots of the field, the first and second sub-windings connected so that current flows from an outside to an inside of the first sub-winding as it is disposed in the slots of the field and from an inside to an outside of the second sub-winding as it is disposed in the slots of the field.

23. The apparatus of claim 16 wherein the first and second sub-windings of the start winding are connected so that electrical current flows through them in opposite directions.

24. The apparatus of claim 23 wherein the power tool is a chop saw and the electric motor is at least a four horsepower motor.

25. The apparatus of claim 16 wherein the first and second sub-windings of the start winding are disposed in slots of the field, the first and second sub-windings connected so that current flows from an outside to an inside of the first sub-winding as it is disposed in the slots of the field and from an inside to an outside of the second sub-winding as it is disposed in the slots of the field.

26. The apparatus of claim 25 wherein the power tool is a chop saw and the electric motor is at least a four horsepower motor.

27. The apparatus of claim 26 wherein the electric motor is a universal motor.

28. The apparatus of claim 16 wherein the switch is any of a time delay switch, an electro-mechanical switch, or an electronic switch.

29. A power tool, comprising:
 a housing having an electric motor disposed therein that drives a tool;
 the electric motor having a field, an armature and a start impedance, the field having field windings,
 a switch that couples the electric motor to a source of AC power with the start impedance in series with the field windings when the switch is first placed in an on position;
 a time delay relay having a set of delay contacts coupled across the start impedance, the time delay relay energized by the switch being placed in the on position, the delay contacts of the time delay relay being open during a soft start period that begins when the switch is first placed in the on position and closing upon the expiration of the soft start period to bypass the start impedance.

30. The apparatus of claim 29 wherein the start impedance is a resistance.

31. The apparatus of claim 29 wherein the start impedance is a start winding in the field.

32. The apparatus of claim 31 wherein the start winding includes first and second sub-windings connected together so that the magnetic fields generated by the first and second sub-windings counterbalance each other.

33. The apparatus of claim 32 wherein the power tool is a chop saw and the electric motor is at least four horsepowers.

34. The apparatus of claim 29 wherein the power tool is a chop saw and the electric motor is at least a four horsepower electric motor.

35. The apparatus of claim 34 wherein the electric motor is a universal motor.

* * * * *